United States Patent
Johansson et al.

(10) Patent No.: US 10,212,617 B2
(45) Date of Patent: Feb. 19, 2019

(54) QOS VERIFICATION AND THROUGHPUT MEASUREMENT FOR MINIMIZATION OF DRIVE TEST

(71) Applicant: MEDIATEK INC., Hsinchu (TW)

(72) Inventors: Per Johan Mikael Johansson, Kungsangen (SE); Yih-Shen Chen, Hsinchu (TW)

(73) Assignee: HFI Innovation INC., HsinChu (TW)

( * ) Notice: Subject to any disclaimer, the term of this patent is extended or adjusted under 35 U.S.C. 154(b) by 40 days.

(21) Appl. No.: 14/859,604

(22) Filed: Sep. 21, 2015

(65) Prior Publication Data

US 2016/0014629 A1     Jan. 14, 2016

Related U.S. Application Data

(63) Continuation of application No. 13/633,432, filed on Oct. 2, 2012, now Pat. No. 9,161,253.
(Continued)

(51) Int. Cl.
*H04W 72/04*     (2009.01)
*H04W 24/08*     (2009.01)
(Continued)

(52) U.S. Cl.
CPC .......... *H04W 24/08* (2013.01); *H04W 24/10* (2013.01); *H04W 36/0005* (2013.01);
(Continued)

(58) Field of Classification Search
CPC ...... H04L 65/4069; H04L 47/32; H04L 69/22
(Continued)

(56) References Cited

U.S. PATENT DOCUMENTS

| 6,640,105 | B1 | 10/2003 | Shin ........................... 455/453 |
| 6,791,995 | B1 | 9/2004 | Azenkot et al. ............. 370/436 |

(Continued)

FOREIGN PATENT DOCUMENTS

| CN | 101521891 A | 9/2009 |
| CN | 101765118 A | 6/2010 |

(Continued)

OTHER PUBLICATIONS

USPTO, Office Action for related U.S. Appl. No. 14/859,624 dated Nov. 17, 2015 (6 pages).
(Continued)

*Primary Examiner* — Alex Skripnikov
*Assistant Examiner* — Pamit Kaur
(74) *Attorney, Agent, or Firm* — Imperium Patent Works; Zheng Jin; Helen Mao

(57) ABSTRACT

A method of throughput and data volume measurement for minimization of drive test (MDT) is proposed. A base station establishes a radio resource control (RRC) connection with a user equipment (UE) in a mobile communication network. The base station or UE measures transmitted or received data volume during a transmission time of a data burst between the base station and the UE. When the data burst spans multiple measurement periods and the data burst is split at each measurement period boundary. For each measurement period, data volume during the measurement period is measured to generate a measurement result. When throughput measurement is performed by the network, the base station receives location information that is available during the transmission time of the data burst. The data volume measurement is logged with time stamp such that each measurement result can correlated with the location information.

15 Claims, 9 Drawing Sheets

Related U.S. Application Data

(60) Provisional application No. 61/542,395, filed on Oct. 3, 2011.

(51) Int. Cl.
*H04W 24/10* (2009.01)
*H04W 36/00* (2009.01)
*H04W 64/00* (2009.01)
*H04W 76/19* (2018.01)
*H04W 88/02* (2009.01)
*H04W 88/08* (2009.01)

(52) U.S. Cl.
CPC ....... *H04W 64/00* (2013.01); *H04W 72/0406* (2013.01); *H04W 76/19* (2018.02); *H04W 88/02* (2013.01); *H04W 88/08* (2013.01)

(58) Field of Classification Search
USPC .................................................. 370/335, 342
See application file for complete search history.

(56) References Cited

U.S. PATENT DOCUMENTS

| | | | |
|---|---|---|---|
| 6,816,456 B1 | 11/2004 | Tse-Au | 370/230.1 |
| 6,850,981 B1 | 2/2005 | Ho et al. | 709/227 |
| 7,406,314 B2 | 7/2008 | Sharma | 455/445 |
| 7,747,221 B2 | 6/2010 | Lee | 455/63.1 |
| 8,621,100 B1* | 12/2013 | Yeluri | H04L 45/00 370/229 |
| 8,731,477 B2 | 5/2014 | Ekici et al. | 455/67.11 |
| 2002/0004379 A1 | 1/2002 | Gruhl et al. | 455/403 |
| 2006/0285523 A1* | 12/2006 | Ishii | H04W 28/08 370/335 |
| 2007/0183312 A1 | 8/2007 | Kim | 370/210 |
| 2008/0205266 A1 | 8/2008 | Hahm | 370/229 |
| 2008/0225842 A1 | 9/2008 | Goldfein et al. | 370/389 |
| 2009/0054001 A1* | 2/2009 | Westerberg | H04L 43/0858 455/67.11 |
| 2010/0069083 A1 | 3/2010 | Wei et al. | 455/452.2 |
| 2010/0254321 A1* | 10/2010 | Kim | H04L 47/14 370/329 |
| 2010/0330994 A1* | 12/2010 | Matsuo | H04J 11/0069 455/436 |
| 2012/0195388 A1 | 8/2012 | Oike | 375/259 |
| 2012/0208548 A1 | 8/2012 | Park | 455/452.2 |
| 2013/0137379 A1* | 5/2013 | Jung | H04W 24/00 455/67.11 |
| 2014/0022933 A1 | 1/2014 | Yi et al. | 370/253 |
| 2014/0219089 A1 | 8/2014 | Ericson et al. | 370/232 |

FOREIGN PATENT DOCUMENTS

| | | |
|---|---|---|
| CN | 101803302 A | 8/2010 |
| CN | 101819609 A | 9/2010 |
| WO | WO2011085238 A2 | 7/2011 |
| WO | WO2011101026 A1 | 8/2011 |

OTHER PUBLICATIONS

International Search Report and Written Opinion of International Search Authority for PCT/CN2012/082571 dated Jan. 17, 2013 (13 pages).
SIPO, Office Action for the CN patent application 201280044827.1 (no English translation is available) dated Dec. 28, 2016 (9 pages).
3GPP TSG RAN WG2 Meeting #75bis R2-115102, CATT, Location Information for QoS Verification, Zhuhai, China dated Oct. 10-14, 2011 (2 pages).

* cited by examiner

QOS VERIFICATION AND THROUGHPUT MEASUREMENT FOR MINIMIZATION OF DRIVE TEST

CROSS REFERENCE TO RELATED APPLICATIONS

This application is a continuation, and claims priority under 35 U.S.C. § 120 from nonprovisional U.S. patent application Ser. No. 13/633,432, entitled "QoS Verification and Throughput Measurement for Minimization of Drive Test," filed on Oct. 2, 2012, the subject matter of which is incorporated herein by reference. Application Ser. No. 13/633,432, in turn, claims priority under 35 U.S.C. § 119 from U.S. Provisional Application No. 61/542,395, entitled "QoS Verification Measurement," filed on Oct. 3, 2011, the subject matter of which is incorporated herein by reference.

TECHNICAL FIELD

The disclosed embodiments relate generally to QoS verification throughput measurement by minimization of drive test (MDT), and, more particularly, to throughput measurement that fulfills MDT requirements at minimum complexity.

BACKGROUND

The $3^{rd}$ Generation Partnership Project (3GPP) long term evolution (LTE) system, introduced as 3GPP release 8, is an improved universal mobile telecommunication system (UMTS). An LTE system offers high peak data rates, low latency, improved system capacity, and low operating cost resulting from simple network architecture. In the LTE system, an evolved universal terrestrial radio access network (E-UTRAN) includes a plurality of evolved Node-Bs (eNBs) communicating with a plurality of mobile stations, referred as user equipment (UE). 3GPP introduces new features to help LTE system operators to further optimize network planning in a cost-effective way. Minimization of Drive Test (MDT) is one of the features where UEs collect measurements and report measurement information to their serving eNBs.

MDT has been worked on in 3GPP to help with network optimization. Network optimization is traditionally done by manual drive testing, which is costly and causes additional $CO_2$ emissions. The essence of MDT feature is to provide for normal mobile terminals the possibility to record and log information relevant to the radio communication of the mobile terminals, correlated with the geographical location of the mobile terminals. MDT feature enables UEs to perform Operations, Administration, and Maintenance (OAM) activities, such as neighborhood detection, measurements, logging and recording for OAM purposes, which includes radio resource management (RRM) and optimization purposes.

While studying the possible scope of minimization of drive test (e.g., 3GPP TR 36.805), it has been found beneficial to include Quality of Service (QoS) measurements for MDT, and in particular a throughput measurement. It is assumed that it would be desirable to as much as possible mimic manual drive testing. It would be desirable to provide the possibility to measure throughput, and while the UE pass through a network doing frequent handovers. Note that it is expected that frequent handover may affect TCP performance and lead to reduced user-experienced throughput.

Several definitions of throughput measurements exist in 3GPP TR36.314, TR 32.425, and TR 32.451. However, there is no definition supports well all the MDT requirements. It is an objective of the current invention to propose a throughput measurement definition, which fulfills well all the MDT requirements with minimum complexity.

SUMMARY

A method of throughput and data volume measurement for minimization of drive test (MDT) is proposed. A base station establishes a radio resource control (RRC) connection with a user equipment (UE) in a mobile communication network. The network is configured for MDT, and the UE may be configured for MDT. The base station or UE measures transmitted or received data volume during a transmission time of a data burst between the base station and the UE. When the data burst spans multiple measurement periods, the data burst is split at each measurement period boundary. For each measurement period, data volume during the measurement period time is measured to generate a measurement result. When throughput measurement is performed by the network, the base station receives location information that is available during the transmission time of the data burst. The data volume measurement during the measurement period is logged with time stamp such that each measurement result can be correlated with the location information or other measurements and system configuration from which location information can be deduced.

In one novel aspect, the throughput measurement for MDT is defined as the data volume over multiple measurement periods, where the idle periods are removed from the measurement periods. In one embodiment (e.g., layer-2 L2-centric), the throughput for MDT is measured as data volume over an active time that includes time when there is data buffered for the measured UE, thus removing idle periods when no data is transmitted or buffered for the measured UE. In another embodiment (e.g., layer-1 L1-centric), the throughput measurement for MDT is measured as data volume over each physical layer transmission interval (TTI), thus removing idle periods by not taking into account non-used TTIs or re-transmission TTIs.

In addition to provide location information, the UE may provide other MDT support information for throughput measurement performed by the network. In one embodiment, when throughput measurement is performed by an eNodeB for uplink transmission, the UE sends an explicit end-marker to the eNodeB to indicate the end of a data burst. In another embodiment, when throughput measurement is continued for connection interruptions, the UE estimates the interruption time and forwards the interruption time to a target eNodeB for consideration. In yet another embodiment, the UE selectively provides location information only during the transmission time of the data burst, defined for the uplink by the time when data is being transmitted or buffered, and defined for the downlink by the time when data is being transmitted and sometime after data transmission or until the UE has received an explicit burst end-marker from the network.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
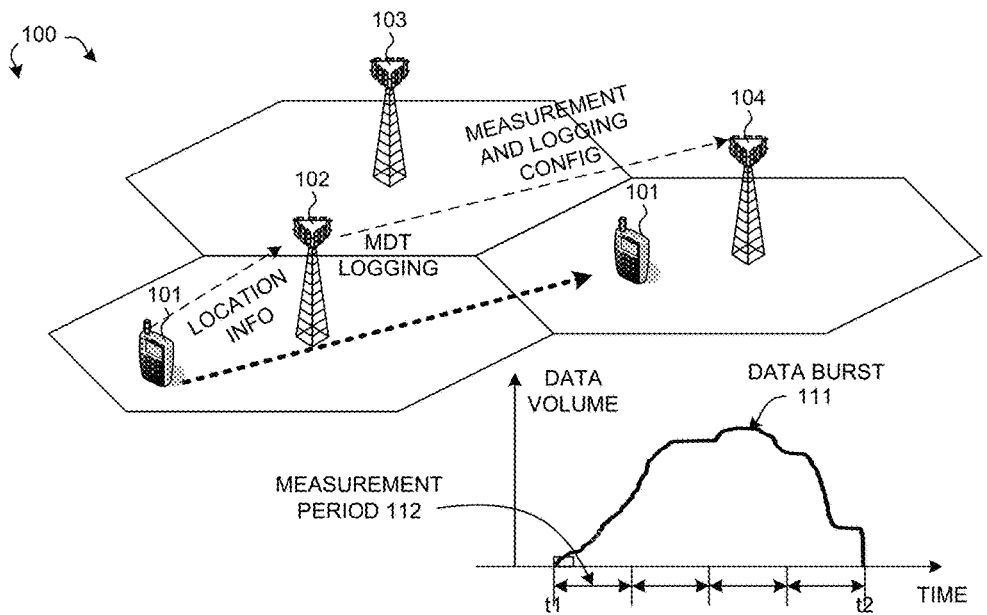
FIG. 1 illustrates a method of throughput measurement for minimization of drive test (MDT) in accordance with one novel aspect.

FIG. 1 illustrates a method of throughput measurement for minimization of drive test (MDT) in a mobile communication network 100 in accordance with one novel aspect. Mobile communication network 100 comprises a user equipment UE 101 and base stations eNB 102-104. UE 101 is initially served by base station eNB 102 and is configured to provide supporting information for minimization of drive test (MDT). During MDT, UE 101 may perform various measurements and report measurement results to its serving eNB 102. There are two types of MDT. For logged MDT, measurements are performed and logged by UE 101 in RRC_IDLE state. UE 101 may report the collected information to the network at a later point of time. For immediate MDT, measurements are performed by the UE 101 in RRC_CONNECTED state. The collected information is available to be reported to the network immediately.

Throughput measurement is one of QoS measurements that indicate the Quality of Service (QoS) of a radio link over the air interface. In general, the throughput of a radio link is equal to the data volume over a measurement period. Unlike manual drive test, however, the data traffic during minimization of drive test is uncontrollable and highly unpredictable. Depending on the applications (e.g., web browsing, file transferring, etc.) running on the UE, the data traffic typically contains many data bursts, each data burst separated by various idle periods. Therefore, traditional throughput definition for manual drive test is no longer suitable for throughput during minimization of drive test.

In one novel aspect, the throughput measurement for MDT is defined as the data volume over multiple measurement periods, where the idle periods are removed from the measurement periods. In one embodiment (e.g., layer-2 L2-centric), the throughput for MDT is measured as data volume over an active time that includes time when there is data buffered for the measured UE, thus removing idle periods when no data is transmitted or buffered for the measured UE. In another embodiment (e.g., layer-1 L1-centric), the throughput measurement for MDT is measured as data volume over each physical layer transmission interval (TTI), thus removing idle periods by not taking into account non-used TTIs or re-transmission TTIs.

In the example of FIG. 1, eNB 102 measures the data volume for data burst 111 over multiple measurement periods (e.g., measurement period 112), when there is data buffered for UE 101. Each measurement period is associated with a measurement result. Furthermore, the throughput measurement results are logged and correlated with location information. The usage of measurement period allows location to be correlated with measurement results also for very long data bursts, e.g. continuous downloads. When the MDT logging is performed by the network, UE 101 provides location information to its serving eNB 102 such that the network can perform the correlation. Later on, when connection interruption occurs (e.g., UE 101 handovers from source eNB 102 to target eNB 104), throughput measurements are continued. Measurement and MDT logging configuration is forwarded from source eNB 102 to target eNB 104, and UE 101 may estimate the interruption time and provide the estimated interruption time to the network for consideration.

Figure 2:
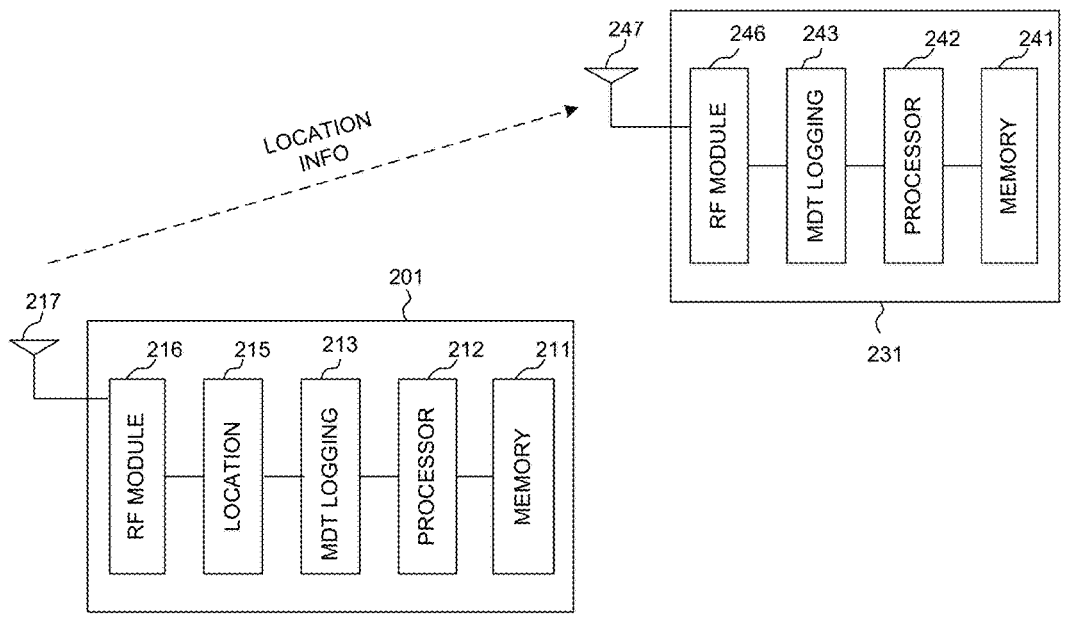
FIG. 2 illustrates simplified block diagrams of a user equipment (UE) and a base station (eNodeB) in accordance with one novel aspect.

FIG. 2 illustrates simplified block diagrams of a user equipment UE 201 and a base station eNodeB 231 in accordance with one novel aspect. UE 201 comprises memory 211, a processor 212, an MDT logging module 213 that performs MDT measurements/logging/reporting, a location module 214 that provides location information, and a radio frequency (RF) module 215 coupled to an antenna 216 for transmitting and receiving radio signals. Similarly, serving eNodeB 211 comprises memory 241, a processor 242, an MDT logging module 243 that performs MDT throughput measurement and MDT logging, and a radio frequency (RF) module 246 coupled to an antenna 247 for transmitting and receiving radio signals. The different function modules are circuits that can be configured and implemented by software, firmware, hardware, or any combination thereof. The function modules, when executed by the processors 212 and 242 (e.g., via program instructions contained in memory 211 and 241), allow UE 201 and eNodeB 231 to perform MDT throughput measurements and MDT logging with location information correlation.

In L2-centric throughput measurement, data volume is measured for each data burst by removing the idle periods between two consecutive data bursts. Assume that the wireless hop is the narrowest link in the network. The L2-centric measurement would reflect the throughput limitation imposed by the wireless hop on bandwidth-elastic applications, taking into account all RF, RRM and load constraints. One issue of the L2-centric method is the detection of the end of each data burst. This is particularly problematic if the throughput is measured for a certain application, for a certain bearer or a group of bearers, e.g. all bearers of a QoS class. One way of detecting the end of a data burst is by detecting whether there is still data buffered for the measured UE or the measured bearer(s). Because the data buffers exist at the transmitting side, it would be easy for the transmitter to make such detection. However, if throughput measurement is performed at the receiving side, then the receiver needs to detect whether there is data buffered for the measured UE at the transmitting side.

Figure 3:
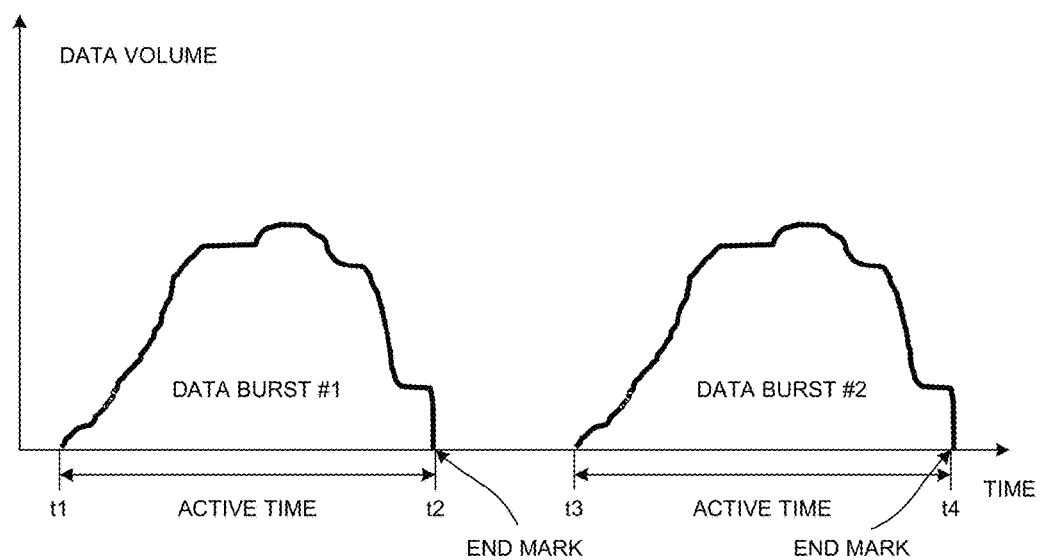
FIG. 3 illustrates one embodiment of detection of end of data burst at receiver side, by assistance from the transmitter, sending an end-marker.

FIG. 3 illustrates one embodiment of detection of end of a data burst at the receiver side. In this embodiment, the end of a data burst is detected by the receiver using an explicit end-marker sent from the transmitter. In the example of FIG. 3, a first data burst #1 (from time t1 to t2) is followed by a second data burst #2 (from time t3 to t4). Taking data burst #1 as an example, for accurate throughput measurement, the data volume of data burst #1 is measured over the active time from time t1 to t2, which produces a measurement result of data rate for measurement period T=t2−t1. That is, Data Rate=Data volume V/Measurement Period T, where V=received data volume (L2 upper SAP), T=t2−t1, where t1=TTI when first piece of data burst #1 begins reception, and t2=TTI when last piece of data burst #1 is successfully received, or when transmission of the last piece of data burst #1 is given up. In order for the receiver to know the exact time t2 of the end of data burst #1, the transmitter sends an explicit end marker. For downlink measurement performed at the UE, the end-marker is sent by the eNodeB to assist the UE performing the throughput measurement. For uplink measurement performed at the eNodeB, the end-marker is sent by the UE to assist the eNodeB performing the throughput measurement. In one specific example, the end-marker is contained in a Medium Access Control (MAC) extension that is either a separate Boolean bit or a Buffer status report (BSR) indicating zero data volume.

Figure 4:
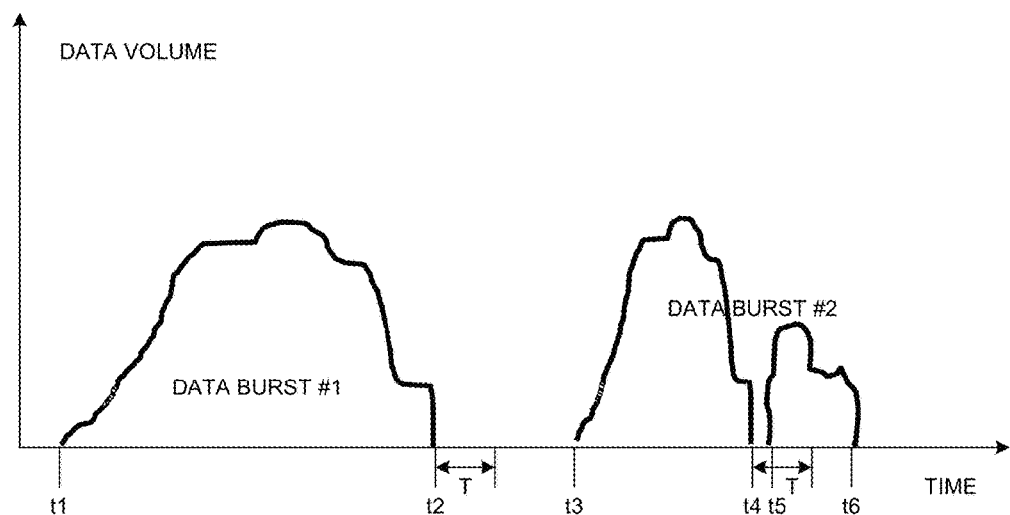
FIG. 4 illustrates another embodiment of detection of end of data burst at receiver side.

FIG. 4 illustrates another embodiment of detection of end of a data burst at the receiver side. In this embodiment, the end of a data burst is detected by the receiver by the absence of a following data transmission for an absent time duration. In the example of FIG. 4, a first data burst #1 (from time t1 to t2) is followed by a second data burst #2 (from time t3 to t6). While data burst #1 and data burst #2 are separated by a relatively longer time gap (from time t2 to t3), data burst #2 contains a shorter time gap (from time t4 to t5). To detect the end time t2 of data burst #1, the receiver determines whether there is more data transmission for an absent time duration T. Because there is no data transmission from time t2 and t3, and the time gap from t2 to t3 is larger than the absent time duration T, the receiver is able to detect that time t2 is the end of data burst #1. On the other hand, for data burst #2, although there is no data transmission from time t4 to t5, but because the time gap from t4 to t5 is smaller than the absent time duration T, the receivers is able to determine that time t4 is not the end of data burst #2. Instead, the time gap from t4 to t5 is likely to be a small scheduling gap during data burst #2.

A second issue of L2-centric throughput measurement is how to properly correlation measurement results with location information of the measured UE. In order to correlate MDT throughput measurement with location information, detailed location information, e.g., GNSS information, that is available during the active time is provided for logging and logged. For example, location information that was available during the start of active time could be logged, or location information that becomes available during the active time could be logged. Furthermore, because the UE may move, it would be good to avoid usage of location information that is too old, e.g., by not including too old location information, or by providing separate time stamps for location information in logs, e.g., based on GNSS time.

Another important aspect of location acquisition is resource usage, e.g. UE battery usage. In the current era of increasingly popular smart-phones, UEs may stay very long times in connected mode without transferring large amounts of data, to efficiently handle background traffic caused by social applications such as Skype or Facebook. In such scenarios, performing periodic positioning for a UE during all connected time would consume many resources. As for throughput and other QoS measurements, it is only interesting to log UE location when the QoS measurement is done, a lot of resource consumption saving could be done by only acquiring location while there is user plane traffic or during the transmission time of a data burst. In one embodiment, the network provides an end-marker to the UE indicating the end of a downlink data-burst, meaning that if there is no uplink activity, then the UE may stop providing location information. The downlink end-marker may have the explicit meaning that this is the end of a data burst, or it may have the explicit meaning that the network commands the UE to stop providing MDT assistance information that is related to the Downlink data transmission.

To handle data transmissions with long active times, the measurements may be split in time domain such that multiple data volume during active time measurement results are provided, each measurement result applicable for a certain time duration, and for each of the said time durations in time domain, location information or information from which location information can be deduced can be provided. Here, the time duration is equivalent and is referred to as the measurement period. For each measurement period, the long data burst is split at each measurement period boundary, and data volume is measured. As a result, measurement result is generated for each measurement period, which can be correlated with location information.

Figure 5:
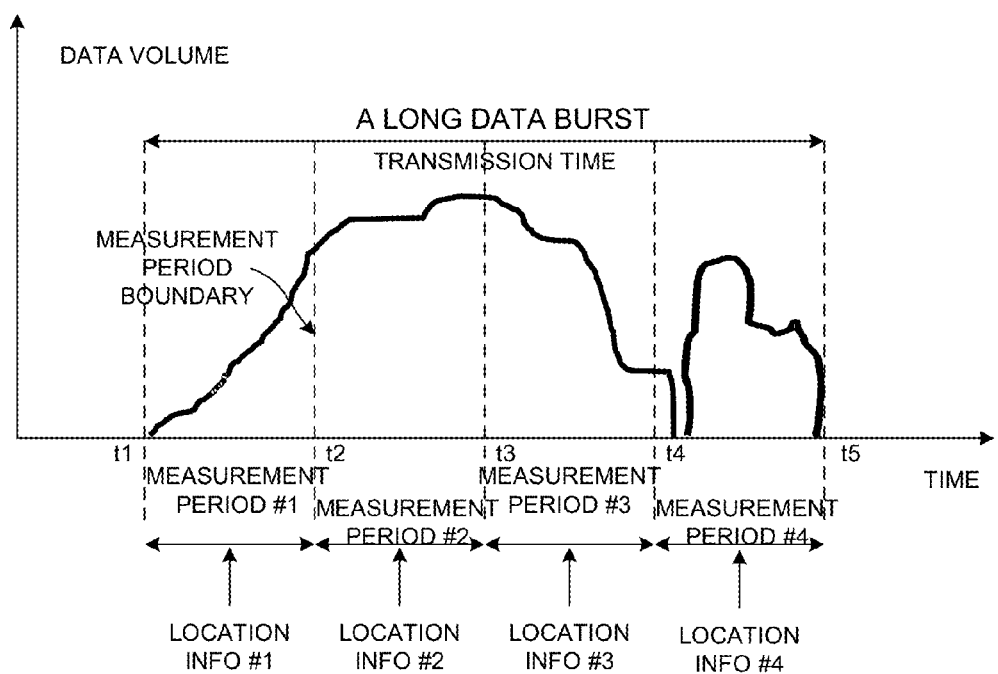
FIG. 5 illustrates one embodiment of throughput measurement with location information correlation.

FIG. 5 illustrates one embodiment of throughput measurement with location information correlation. In the example of FIG. 5, a long data burst starts at time t1 and ends at time t5 during a transmission time. The entire transmission time from t1 to t5 is then split into four measurement periods in time domain. The data burst is also split at each measurement period boundary (e.g., at time t2). For example, during measurement period #1 (T1=t2−t1), the data volume V1 of the data burst from t1 to t2 is measured and a first measurement result is calculated, e.g. Data Rate#1=(Data volume V1)/(Measurement Period T1). Similarly, during measurement period #2 (T2=t3−t2), the data volume V2 of the data burst from t2 to t3 is measured and a second measurement result is calculated, e.g. Data Rate#2=(Data volume V2)/(Measurement Period T1). Same for measurement periods #3 and #4.

For each measurement period (e.g., measurement period #1), the data volume V1 and time T1 need to start/stop at the measurement period start/stop. For example, T1=t2−t1, where t1=TTI when first piece of a data burst begins transmission/reception, or first TTI of measurement period when data is buffered in L2 and transmission of data burst has begun; t2=TTI when last piece of data burst successfully received, or last TTI of measurement period when data is buffered in L2 and transmission of data burst has begun; V=data volume successfully received or transmitted for a data burst during measurement period. L2 upper SAP can be used to determine which bits to count. If measurement is performed in the transmitting end, then HARQ ACK can be used to determine successful transmission.

Typically, for MDT, it is needed to be able to correlate each measurement period with location information and with time stamp information. In General, the UE only selectively provides location information during the transmission time of the data burst, when data is being transmitted, buffered for transmission, received, or until the UE receives an end-marker. For example, the UE provides location information #1 during measurement period #1, provides location information #2 during measurement period #2, and so on so forth. The time stamp information could be implicit, e.g., the first measurement period of each data burst has a time stamp, the measurement period may be fixed and corresponding time stamp could be deduced. The measurement periods do not need to coincide with the data transmission active time. For measurement periods with no data transmission activity, no data rate and no location information need to be logged.

Each measurement period is either triggered periodically, with the periodical time being configurable, or triggered based on a radio condition change, a link adaptation change, or a mobility event. If the average preconditions for a certain throughput stays the same, and the location has not changed a lot, then there is no need to stop/start a new measurement period. For optimal logging, reduced size of log files, etc., the determination of start/stop of a logging duration should be configurable. However, for simplest possible implementation, the start and stop boundaries of a measurement period may be indicated by a time stamp, or a simplified time stamp, e.g., a measurement period counter. Alternatively, the start and stop boundaries can be known a priori, e.g., they may be Modulo-N based on system frame number (SFN), and the time stamp of location information may be sufficient to infer the measurement period timing.

Note that when splitting a data burst into several time durations, it is not evident how to determine to what time duration a data volume belongs. It is proposed to have a simple criterion such that data that has been successfully received or successfully transmitted as indicated by HARQ ACK during a measurement period is included in the data volume measurement for that measurement period. Having a criteria based on successful reception of data based on HARQ ACK comes with several advantages, such as easy interpretation and that definition is consistent with the ending time duration of a data burst when all data has been transmitted.

A third issue of L2-centric throughput measurement is handling connection interruptions during measurement. Connection interruptions include mobility when UE changes cell (e.g., handover, redirection), connection failure (e.g., radio link failure, handover failure, RRC re-establishment failure followed by a connection recovery, e.g., RRC re-establishment, e.g., NAS-triggered recovery). It is proposed that MDT throughput measurement is continued at connection interruptions. The idea is that measurements shall continue as before the connection interruption to create a good view of what was the impact of the connection interruption to the user perceived data throughput, e.g., what is the TCP impact. For regular drive testing where the throughput measurement is always performed in the UE, and on the IP layer, connection interruption impact to QoS measurements is always taken into account. In case it is difficult to include the interruption time, and the actual interruption time is short, it could be counted separately or even removed from the measurement period count. One simple implementation is to stop one measurement period at the connection failure, and to start the next measurement period when connection has been recovered.

Figure 6A:
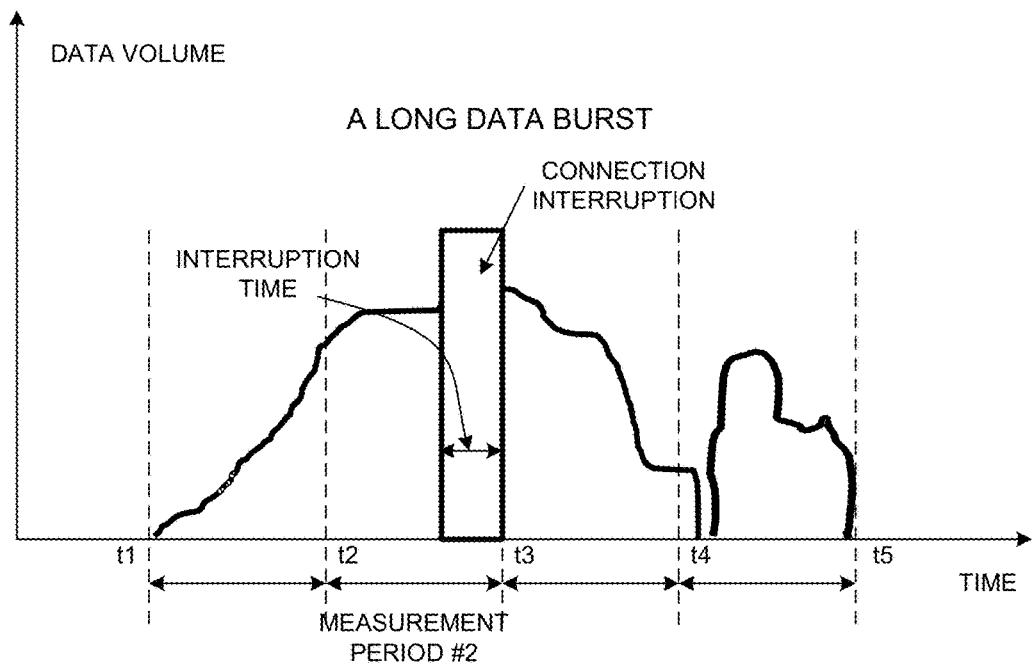
FIG. 6A illustrates one embodiment of MDT throughput measurement during connection interruptions.

FIG. 6A illustrates one embodiment MDT throughput measurement during connection interruptions, where measurement is continued. In the example of FIG. 6A, a long data burst starts at time t1 and ends at time t5. The entire active time from t1 to t5 is then split into four measurement periods in time domain. However, during measurement period #2, a connection interruption occurs. Throughput measurement is continued for the connection interruption. If the measurement is performed at the UE, the measurement period just continues as long as there are data in the buffers regardless UE state changes. UE continues the measurement period, e.g., based on SFN of the cell where the UE received measurement configuration, or synchronize to new cell SFN resulting in irregular measurement periods at cell changes.

Figure 6B:
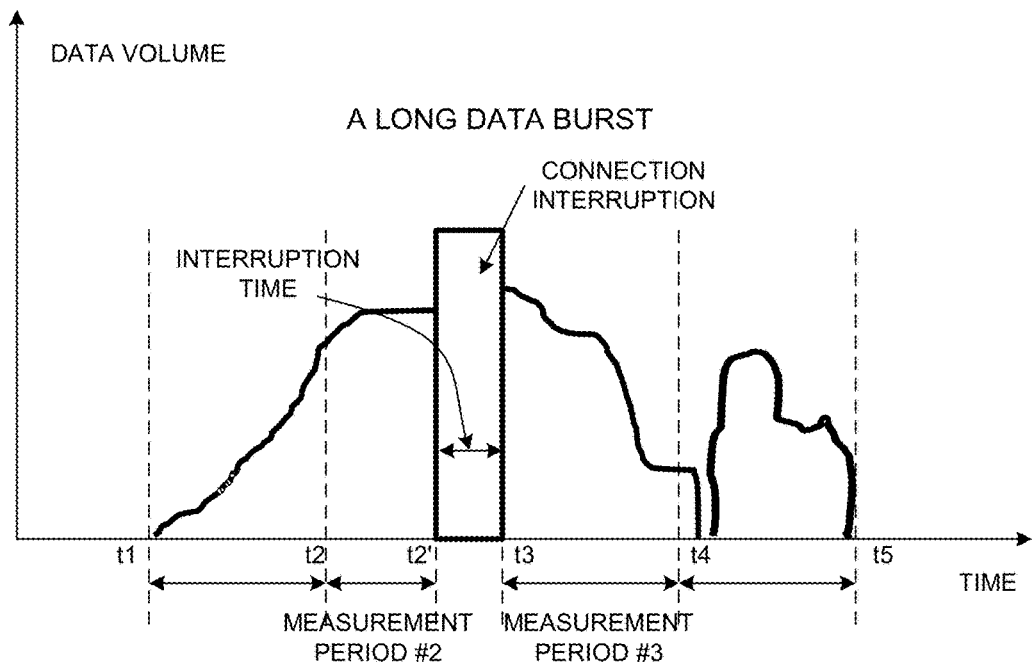
FIG. 6B illustrates another embodiment of MDT throughput measurement during connection interruptions.

FIG. 6B illustrates another embodiment MDT throughput measurement during connection interruptions, where measurement is restarted. FIG. 6B is very similar to FIG. 6A. When connection interruption occurs at time t2', however, measurement is stopped and restarted after the interruption at time t3. Such method would actually capture TCP congestion reactions on the connection interruption, e.g., for handover implicitly by change of serving cell, for RRC re-establishment or NAS-triggered recovery, as such events could be indicated explicitly in the log. Providing the interruption time and interruptions and log those separately would allow for the post processing system to take interruptions into account flexibly in several ways.

If throughput measurement is performed at the network side, then at inter-node handover preparation, measurement and logging configuration is forwarded from source eNodeB to target eNodeB. In order to continue or restart measurement at handover, the new radio access radio network node needs to know what measurements to start, and the parameters needed to configure the measurements correctly. Furthermore, at cell change or handover, or other connection interruption (RRC re-establishment), the UE estimates the interruption time caused by the interruption. The UE then provides the interruption time to the RAN to be taken into account.

Figure 7:
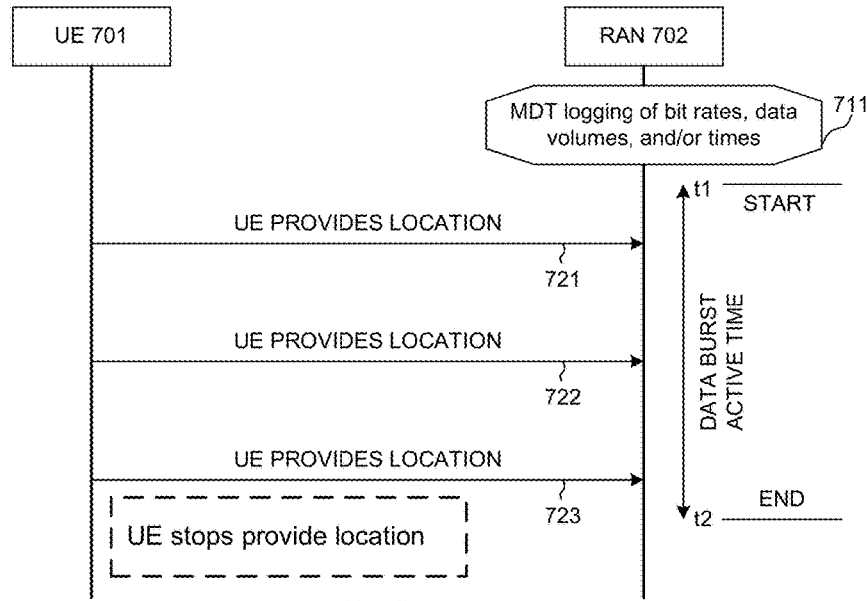
FIG. 7 illustrates a method of throughput measurement and MDT logging performed at an eNodeB.

FIG. 7 illustrates a method of throughput measurement and MDT logging performed at an eNodeB in a mobile communication network. In step 711, RAN 702 starts to perform MDT throughput measurement and MDT logging of bit rates, data volumes, and/or times for a data burst that having an active time from t1 to t2. During the active time, the measurement is split into multiple measurement periods in time domain, and each measurement period is associated with a measurement result. When MDT throughput measurement is performed by RAN 702, it is sufficient that UE 701 reports location information for each measurement period (e.g., in steps 721, 722 and 723) and the network correlates the throughput measurement with the location information. Later, UE 701 stops provide location information after the end of the data burst or data transmission is not ongoing. For measurement periods with no data transmission activity, no data rate and no location information need to be logged.

Figure 8:
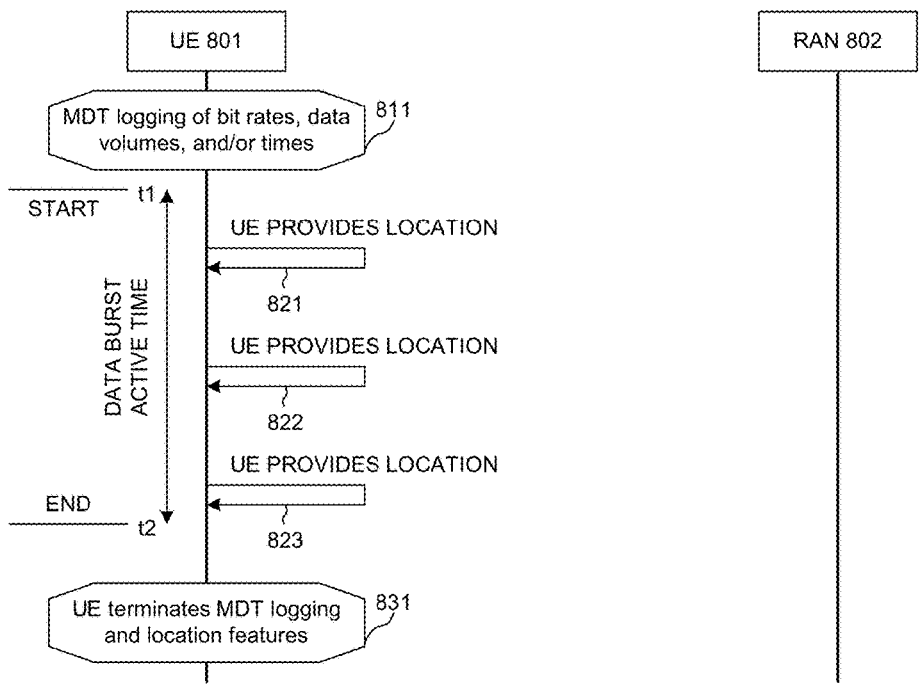
FIG. 8 illustrates a method of throughput measurement and MDT logging performed at a UE.

FIG. 8 illustrates a method of throughput measurement and MDT logging performed at a UE in a mobile communication network. In step 811, UE 801 starts to perform MDT throughput measurement and MDT logging of bit rates, data volumes, and/or times for a data burst that having an active time from t1 to t2. During the active time, the measurement is split into multiple measurement periods in time domain, and each measurement period is associated with a measurement result. UE 801 also logs location information for each measurement period (e.g., in steps 821, 822, and 823). In step 831, UE 801 terminates MDT logging and location features (e.g., when MDT session expires). Location information only needs to be provided and logged when throughput measurement is active, e.g., when transmission is ongoing or data is being buffered. If MDT throughput measurement is not applicable, then related MDT features could be disabled, e.g., location features could be turned off.

The L2-centric throughput measurement is based on the assumption that the wireless hop is the most narrowband link in the network. If there are other significant bottlenecks than the wireless link, then each transmission may result in emptying the data buffers. When data buffer is emptied in one TTI transmission, such transmission is referred to as a single TTI transmission. In such a scenario, the single TTI transmissions (not counting HARQ retransmissions) are excluded from the throughput measurement result. Alternatively, those single TTI transmission are taken into account separately, e.g., by logging data volume and/or explicitly counting or logging each such single TTI transmissions.

In addition to L2-centric throughput measurement, L1-centric solutions may be applied. For L1-centric measurement, data volume is measured for each transmission time interval (TTI). The transmitted or received data volume or throughput includes radio layer 2 overhead, i.e., MAC layer, RLC layer, and PDCP layer overhead. The data volume per TTI measurement is also correlated with UE location information or measurements from which it is possible to derive UE location.

Figure 9:
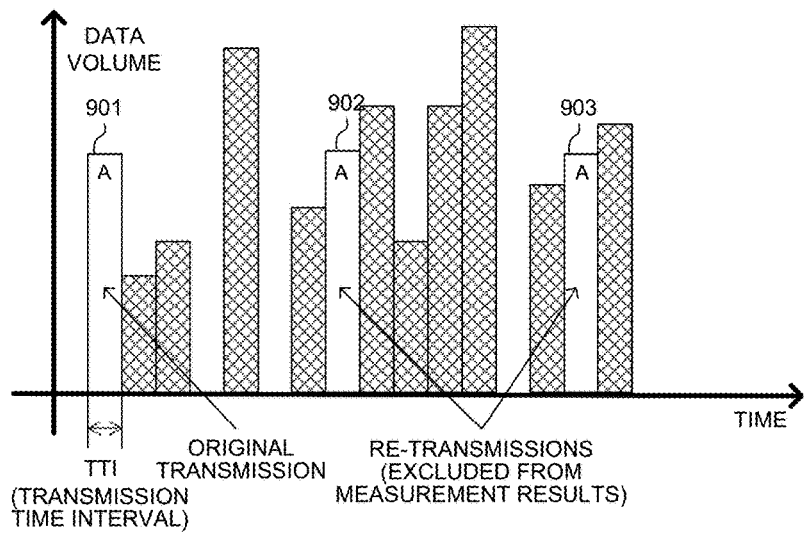
FIG. 9 illustrates one example of physical layer throughput measurement using TTI as measurement period.

FIG. 9 illustrates one example of physical layer throughput measurement using TTI as measurement period. In the example of FIG. 9, non-used TTIs are excluded from the measurement results. That way, idle L1 radio resources are removed for the measured UE. In addition, re-transmission TTIs (e.g., TTIs 902 and 903) are excluded from the measurement results. Only original transmission TTIs (e.g., TTI 901) are taken into account in the measurement results.

Figure 10:
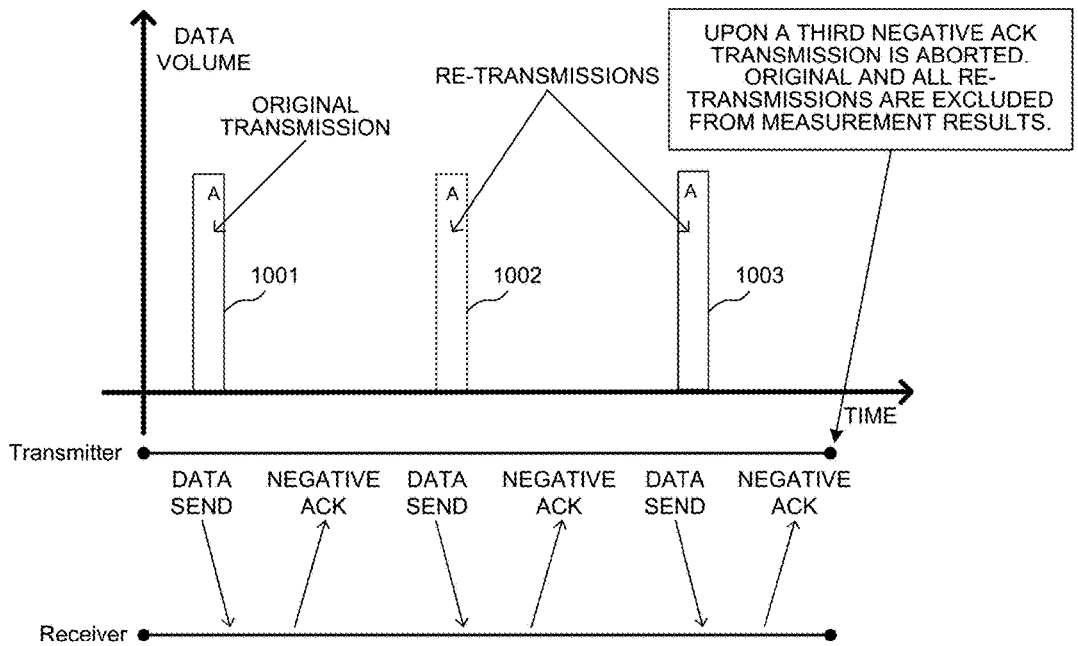
FIG. 10 illustrates another example of physical layer throughput measurement using TTI as measurement period.

FIG. 10 illustrates another example of physical layer throughput measurement using TTI as measurement period. In the example of FIG. 10, for original transmission TTI 1001, if the transmission eventually fails (e.g., upon a third NACK, transmission is aborted), then the original transmission TTI 1001 and all the re-transmission TTIs 1002 and 1003 should not contribute to the measurement results.

Figure 11:
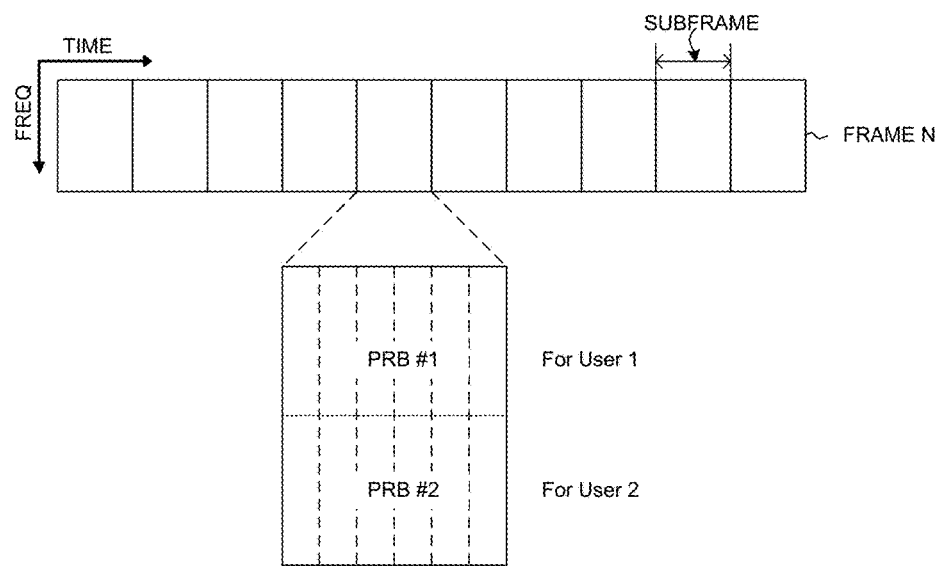
FIG. 11 illustrates an example of measuring bit rate per radio resource for a certain user.

FIG. 11 illustrates an example of measuring bit rate per radio resource for a certain user. The data volume per TTI measurement can be further divided per radio resource, to represent Layer 1 radio resource efficiency. In LTE systems, the radio resource would typically be a physical resource block (PRB) or part of PRB. Thus, data volume is divided per PRBs to reflect bits/PRB efficiency. In WCDMA systems, the data volume may be divided per orthogonal spreading factor reflecting how big part of the code tree resource is used for the data transmission. In case a PRB is used for multiple users, the resource usage is divided by the number of users using it, e.g., for multi-user MIMO, if a PRB is used by two users, then each uses a half PRB. In the example of FIG. 11, each subframe in frame N is a TTI, which contains multiple PRBs. In one example, PRB#1 is for user 1 and PRB#2 is for user 2 for MU-MIMO transmission.

For L1-centric data volume per TTI or data volume per radio resource measurement, if many data samples were available for a certain location, then the recorded amount of data would be very large and difficult to interpret. In this scenario, post processing could be done, to distill representations that are easier to understand and for which they are more compressed data representation.

Figure 12:
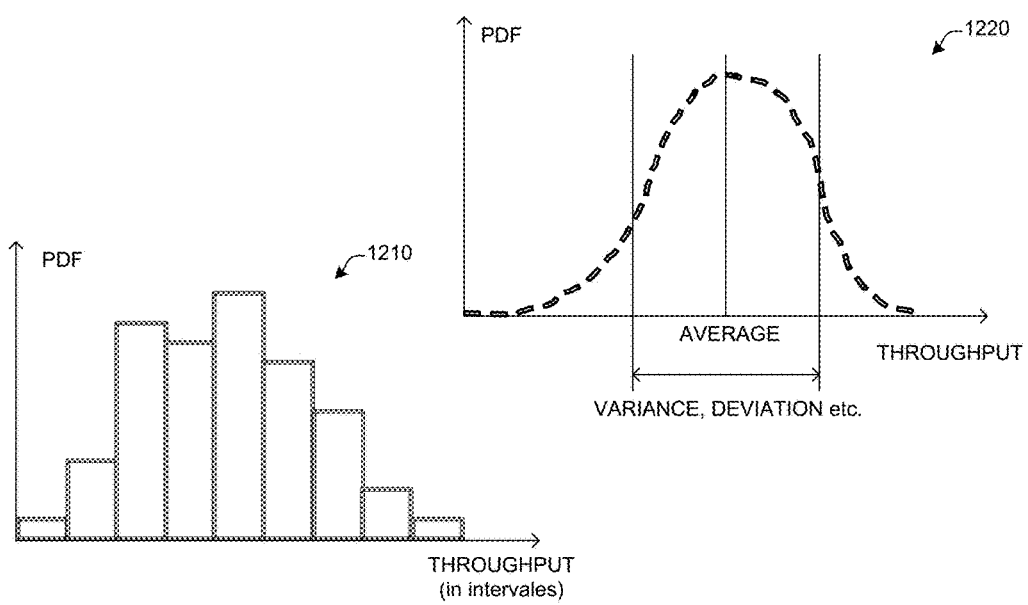
FIG. 12 illustrates post processing for physical layer throughput measurement.

FIG. 12 illustrates post processing for physical layer throughput measurement. In chart 1210, data volume or throughput per intervals is process statistically to form a Probability density function (PDF). In chart 1220, data volume or throughput is process statistically in the form of average, variance or deviation. The processing period is adaptable so that it maps to UE in one location, i.e., an area for which the throughput or data volume measurement is interesting.

Figure 13:
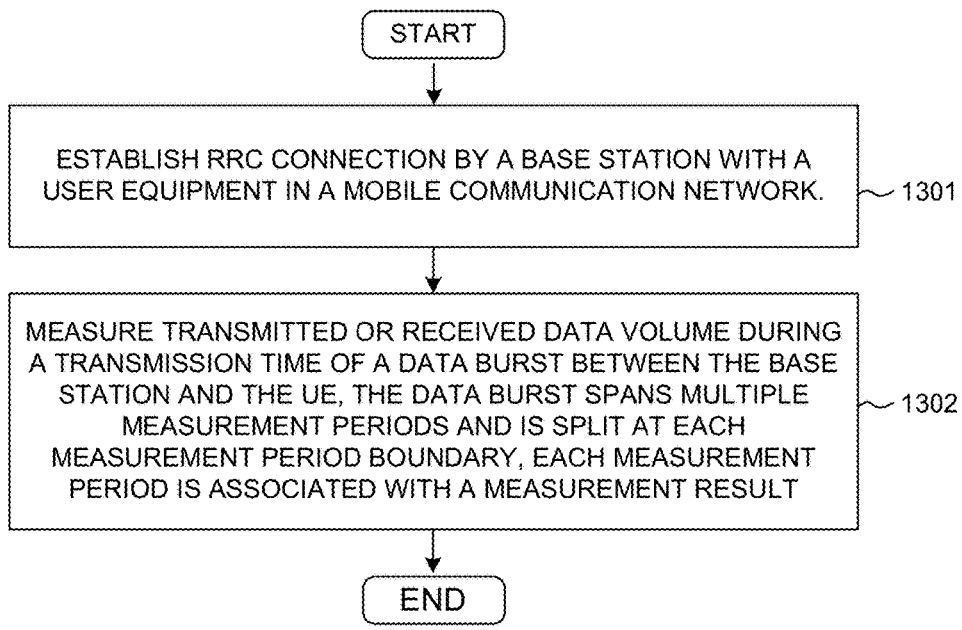
FIG. 13 is a flow chart of a method of throughput measurement for MDT from eNodeB perspective.

FIG. 13 is a flow chart of a method of throughput measurement from eNodeB perspective. In step 1301, a base station (eNodeB) establishes a radio resource control (RRC) connection with a user equipment (UE) in a mobile communication network. In step 1302, the base station measures transmitted or received data volume during a transmission time of a data burst between the base station and the UE. The data burst spans multiple measurement periods and the data burst is split at each measurement period boundary. For each measurement period, data volume is measure to generate a corresponding measurement result. The base station receives location information from the UE such that each measurement result can be correlated with location information.

Figure 14:
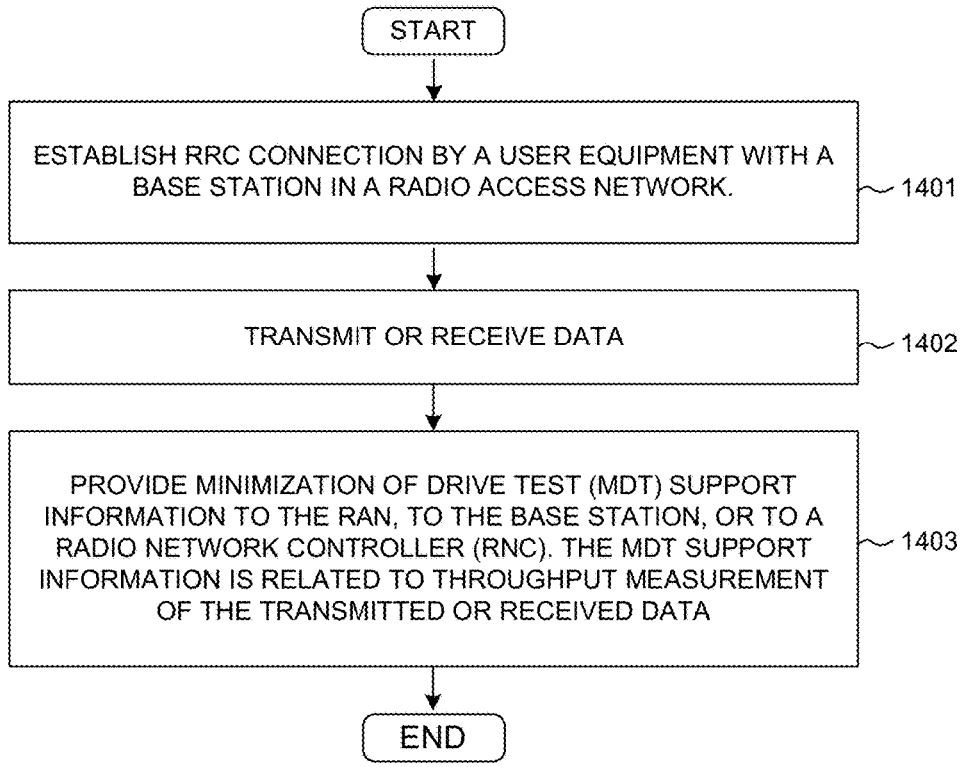
FIG. 14 is a flow chart of a method of providing MDT support information for throughput measurement from UE perspective.

FIG. 14 is a flow chart of a method of providing MDT support information for throughput measurement from UE perspective. In step 1401, a user equipment (UE) establishes a radio resource control (RRC) connection with a base station (eNodeB) in a radio access network (RAN). In step 1402, the UE transmits or receives data traffic. In step 1403, the UE provides MDT support information to the RAN, the eNodeB, or to a radio network controller (RNC). The MDT support information is related to throughput measurement of the transmitted or received data. In one embodiment, the MDT support information comprises location information during the transmission time of the data burst when data is being transmitted, buffered for transmission, being received, or until the UE receives an end-marker from the RAN. In another embodiment, the MDT support information comprises an end-marker to indicate the end of a data burst. In yet another embodiment, the UE estimates the interruption time caused by a connection interruption, and the MDT support information comprises the estimated interruption time forwarded to a target eNodeB for consideration.

Figure 15:
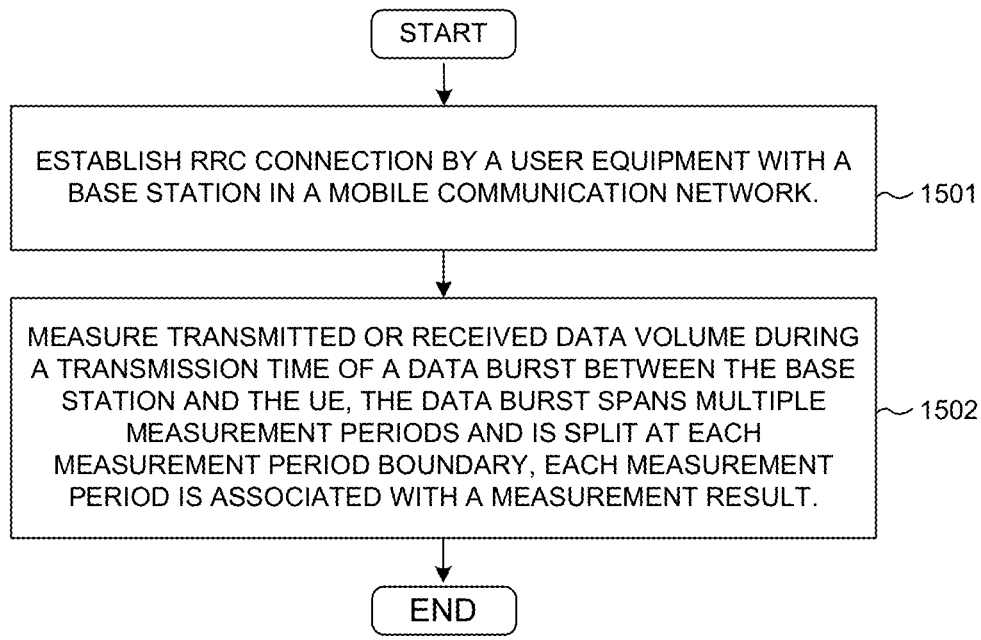
FIG. 15 is a flow chart of a method of throughput measurement for MDT from UE perspective.

FIG. 15 is a flow chart of a method of throughput measurement for MDT from UE perspective. In step 1501, a user equipment (UE) establishes a radio resource control (RRC) connection with a base station (eNodeB) in a mobile communication network. In step 1502, the UE measures transmitted or received data volume during a transmission time of a data burst between the base station and the UE. The data burst spans multiple measurement periods and the data burst is split at each measurement period boundary. For each measurement period, data volume is measure to generate a corresponding measurement result. In one embodiment, each measurement result is logged with time stamp so that it can be correlated with location information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a radio resource control (RRC) connection by a user equipment (UE) with a base station in a radio access network (RAN) for exchanging data traffic;
   transmitting or receiving a data volume during a transmission time of a data burst, wherein the data traffic contains a plurality of data bursts separated by idle periods; and providing minimization of drive test (MDT) support information to the RAN, to the base station, or to a radio network controller (RNC), wherein the MDT support information is related to throughput measurements of the transmitted or received data burst, wherein the UE transmits an explicit end-marker of the data burst together with a last piece of data of the data burst such that a throughput of the data traffic is determined by removing at least idle periods after the explicit end-marker is received in the transmission time.

2. The method of claim 1, wherein the UE provides location information to the base station during the transmission time of the data burst when data is being transmitted, buffered for transmission, being received, or until the UE receives an end-marker from the RAN.

3. The method of claim 2, wherein the UE logs measurement results with time stamps such that the measurement results are correlated with the location information.

4. The method of claim 1, wherein the end-marker is contained in a Medium Access Control (MAC) extension that is either a Boolean bit or a Buffer status report indicating a zero data volume.

5. The method of claim 1, wherein the UE transmits an interruption time, wherein the interruption time is applicable to a handover, a RRC connection re-establishment, or a Non Access Stratum (NAS) triggered connection establishment after a connection failure.

6. A User Equipment (UE), comprising:
memory that contains a set of program instructions;
a radio frequency (RF) transceiver that transmits and receives radio signals; and
a processor that executes the set of program instructions in accordance with the radio signals and thereby controls the UE to perform the steps of:
establishing a radio resource control (RRC) connection by a user equipment (UE) with a base station in a radio access network (RAN) for exchanging data traffic;
transmitting or receiving a data volume during a transmission time of a data burst, wherein the data traffic contains a plurality of data bursts separated by idle periods; and
providing minimization of drive test (MDT) support information to the RAN, to the base station, or to a radio network controller (RNC), wherein the MDT support information is related to throughput measurements of the transmitted or received data burst, wherein the UE transmits an explicit end-marker of the data burst together with a last piece of data of the data burst such that a throughput of the data traffic is determined by removing at least idle periods after the explicit end-marker is received in the transmission time.

7. The UE of claim 6, wherein the UE provides location information to the base station during the transmission time of the data burst when data is being transmitted, buffered for transmission, being received, or until the UE receives an end-marker from the RAN.

8. The UE of claim 7, wherein the UE logs measurement results with time stamps such that the measurement results are correlated with the location information.

9. The UE of claim 6, wherein the end-marker is contained in a Medium Access Control (MAC) extension that is either a Boolean bit or a Buffer status report indicating a zero data volume.

10. The UE of claim 6, wherein the UE transmits an interruption time, wherein the interruption time is applicable to a handover, a RRC connection re-establishment, or a Non Access Stratum (NAS) triggered connection establishment after a connection failure.

11. A method, comprising:
establishing a radio resource control (RRC) connection by a base station with a user equipment (UE) in a radio access network (RAN) for exchanging data traffic;
transmitting or receiving a data volume during a transmission time of a data burst, wherein the data traffic contains a plurality of data bursts separated by idle periods; and
receiving minimization of drive test (MDT) support information by the base station from the UE, wherein the MDT support information is related to throughput measurements of the transmitted or received data burst, wherein the base station receives an explicit end-marker of the data burst together with a last piece of data of the data burst such that a throughput of the data traffic is determined by removing at least idle periods after the explicit end-marker is received in the transmission time.

12. The method of claim 11, wherein the base station receives location information during the transmission time of the data burst when data is being transmitted, buffered for transmission, being received, or until the base station receives an end-marker from the UE.

13. The method of claim 12, wherein the base station receives measurement results with time stamps such that the measurement results are correlated with the location information.

14. The method of claim 11, wherein the end-marker is contained in a Medium Access Control (MAC) extension that is either a Boolean bit or a Buffer status report indicating a zero data volume.

15. The method of claim 11, wherein the base station receives an interruption time, wherein the interruption time is applicable to a handover, a RRC connection re-establishment, or a Non Access Stratum (NAS) triggered connection establishment after a connection failure.

* * * * *